No. 672,748. Patented Apr. 23, 1901.
C. F. ALLEN.
GAS BURNER.
(Application filed Aug. 29, 1900.)
(No Model.)
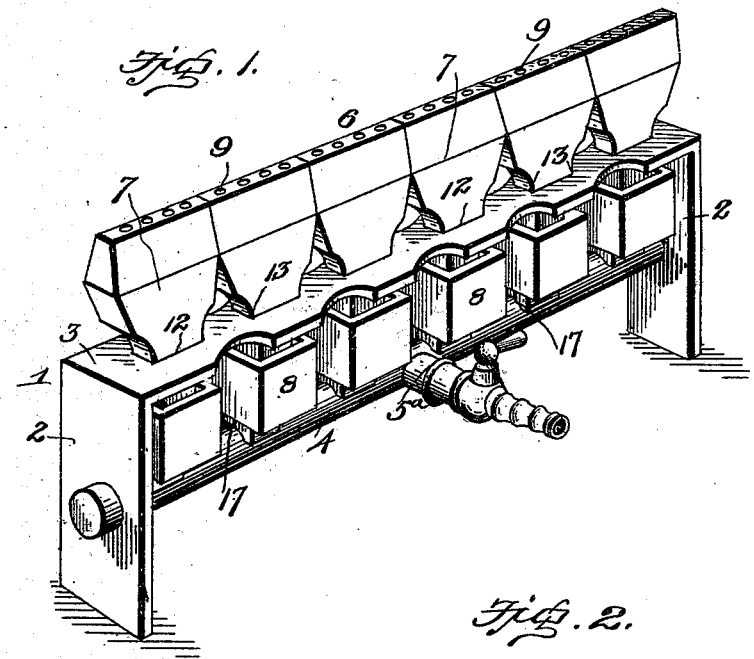
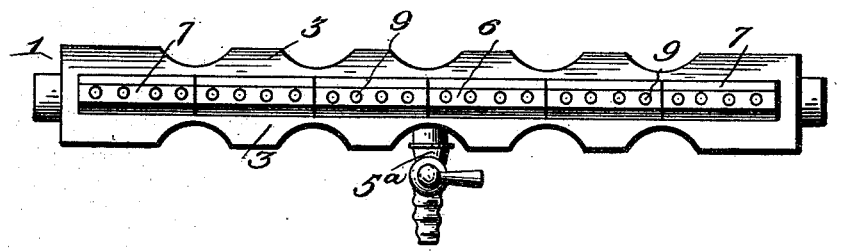
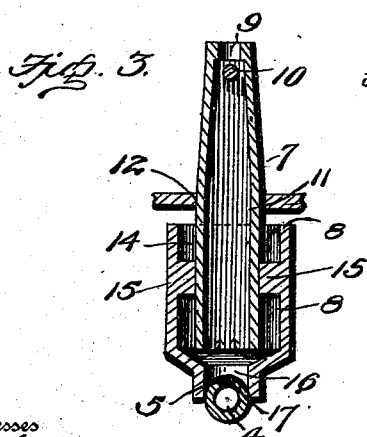
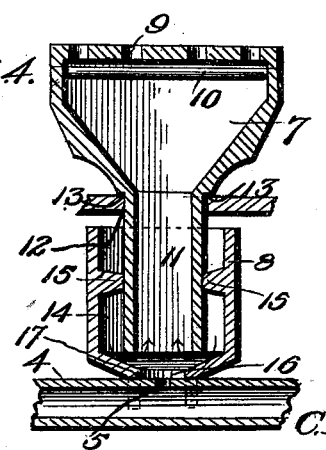
Witnesses
Inventor
C. F. Allen
Attorneys

UNITED STATES PATENT OFFICE.

CHARLES F. ALLEN, OF MASSILLON, OHIO, ASSIGNOR TO THE DAUNTLESS BURNER & GAS STOVE CO., OF SAME PLACE.

GAS-BURNER.

SPECIFICATION forming part of Letters Patent No. 672,748, dated April 23, 1901.

Application filed August 29, 1900. Serial No. 28,425. (No model.)

*To all whom it may concern:*

Be it known that I, CHARLES F. ALLEN, a citizen of the United States, residing at Massillon, in the county of Stark and State of Ohio, have invented certain new and useful Improvements in Gas-Burners; and I do declare the following to be a full, clear, and exact description of the invention, such as will enable others skilled in the art to which it appertains to make and use the same.

My invention relates to improvements in gas-burners, and particularly to a burner for using natural gas.

The object of the invention is to provide a multiple burner in which the burners are mounted so as to be independently removable for cleaning or repairs and are constructed to secure an effective consumption of the gas; and to this end the invention consists of certain novel features of construction, combination, and arrangement of parts, as will be hereinafter more fully described, and particularly pointed out in the appended claims.

In the accompanying drawings, Figure 1 is a perspective view of a gas-burning apparatus embodying my invention. Fig. 2 is a top plan view thereof. Fig. 3 is a cross-section through the frame, supply-pipe, and one of the burners; and Fig. 4 is a longitudinal section thereof.

Referring now more particularly to the drawings, in which like reference characters designate corresponding parts throughout the several views, the numeral 1 represents a supporting-frame composed of end standards 2 and a supporting-bar 3, connecting said standards at their upper ends, and 4 the gas supply or distributing pipe for the burners, supported by the standards below said bar and provided at intervals with jet-orifices 5 for the feed of gas to the burners.

5ª designates a valve-controlled coupling on the pipe 4 for the attachment of a hose leading from a house service-pipe.

6 designates a series of independently-removable burners, each of which consists of a burner-head 7 and a heating-chamber 8. The burner-head 7 is hollow or chambered and comparatively long and narrow and provided in its top with a row of burner-orifices 9 and on the interior below said orifices with a longitudinal spreader rod or wire 10, serving to spread the gas to insure an equal supply to all of said orifices. A hollow rectangular shank 11 projects from the base of the head and extends downward through a correspondingly-shaped slot 12, one for each of the burners, in the bar 2, and at the juncture of the head and shank are formed shoulders 13 to rest upon the bar and support the burner-head in proper position. The lower end of the shank enters the heating-chamber 8, which is open at top and of corresponding greater area than said shank to form an intervening space or passage 14 for the inlet of air to be entrained with the gas. The shoulders 13 hold the lower end of the shank 11 elevated above the bottom of the chamber, and lugs 15, projecting from the sides of the chamber, support the parts in proper relation. The bottom of the chamber is formed with an opening 16 for the inlet of gas from one of the jet-orifices 5 and with a concaved saddle or rest 17 to support said chamber on the pipe 4.

In operation gas is supplied to the burners through the jet-orifices 5 and passes up through the opening 16 into the chamber 8 and thence into the shank 11, whence it is supplied to the burner-orifices 9 after having been uniformly spread by the rod or wire 10. In its passage from the chamber into the shank of the burner the gas entrains with it a large proportion of air, which enters the top of the chamber and thence flows downward through the space or passage 15 and then admixes with the gas and passes up into the burner-head through the shank 11, the gas thus being placed in condition for effective consumption and to produce when ignited a hot flame. The burner-head becomes highly heated by the flames throughout its entire length and throughout the length of the shank, which latter communicates a portion of its heat to the chamber 8, whereby the entering air and gas are heated and rarefied and intimately commingled.

The heating-chamber and burner-head may be removed independently of each other or together, so that access may be conveniently had thereto for cleaning or repairs and for removing any deposit of dirt or carbon from the coöperating jet-orifice 5 in the feed-pipe 4. Any desired number of burners may also be employed by plugging up the jet-orifices communicating with those burners which it is not desired to use. It will thus be seen that the burner is simple in construction, efficient in operation, and affords ready access to all parts. In addition to heating the entering air the construction and arrangement of the heating-chamber 8 and shank 11 effectually prevent the "striking back" or burning of the gas at the orifice 5 in the supply-pipe.

Changes in the form, proportion, and minor details of construction may be made within the scope of the invention without departing from the spirit or sacrificing any of the advantages thereof.

Having thus fully described my invention, what is claimed as new, and desired to be secured by Letters Patent, is—

1. In a burner, the combination, with a support, and a gas-supply pipe below the support and provided with a feed-orifice, of a burner comprising a burner-head detachably connected with the support and provided with a downwardly-extending inlet-shank, and a heating-chamber receiving the shank and having a saddle to rest upon the pipe and a feed-orifice, said chamber being free from fastening engagement with said pipe and supported in position thereon by the said shank, substantially as set forth.

2. In a burner, the combination, with a support, and a gas-supply pipe below the support and provided with a feed-orifice, of a burner comprising a burner-head detachably connected with the support and provided with a downwardly-extending inlet-shank, and a heating-chamber resting on the pipe and having a feed-opening in line with the jet-orifice therein, said chamber being open at top to receive the shank and of larger area than the same to form an intervening passage for the inlet of air, and formed with lugs extending across said space and bearing against the shank to hold the chamber supported, substantially as set forth.

3. In a burner, the combination with a supporting-bar having a slot or opening, and a gas-supply pipe mounted below the same and provided with a feed-orifice, of a burner comprising a burner-head having an inlet-shank adapted to fit down in said slot and shoulders to rest upon the bar, and a heating-chamber open at top to receive the shank and provided on its interior with lugs to hold said shank centered and on its bottom with a saddle to engage the pipe and in said bottom with a gas-inlet adapted to register with the feed-orifice in said pipe, substantially as set forth.

In testimony whereof I have hereunto set my hand in presence of two subscribing witnesses.

CHARLES F. ALLEN.

Witnesses:
FRANK A. PILLE,
R. B. CRAWFORD, Jr.